Aug. 26, 1952 J. E. JENDRISAK 2,608,030
MOLD FOR BENDING GLASS PLATES
Filed Oct. 9, 1947 3 Sheets-Sheet 1

INVENTOR.
Joseph E. Jendrisak
BY
Nobbe & Swope
ATTORNEYS

Aug. 26, 1952   J. E. JENDRISAK   2,608,030
MOLD FOR BENDING GLASS PLATES
Filed Oct. 9, 1947   3 Sheets-Sheet 2
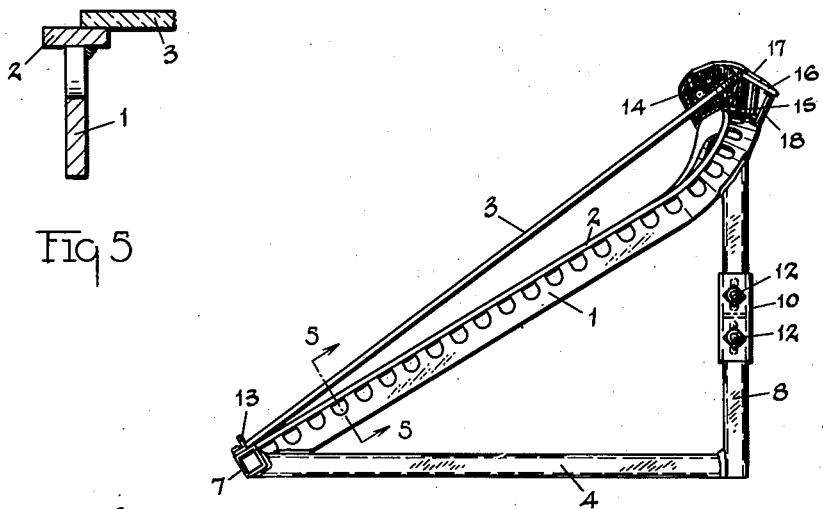
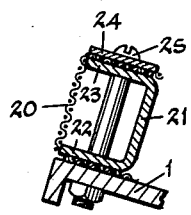
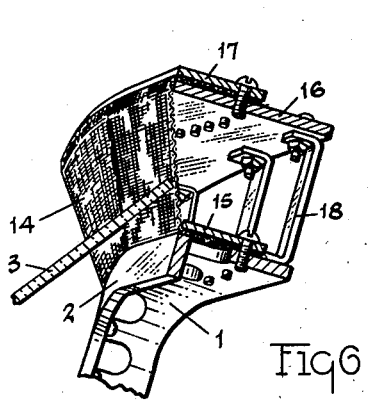
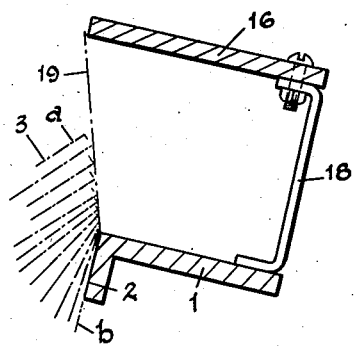
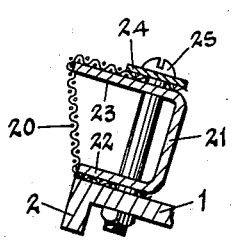
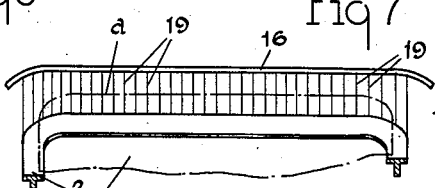
INVENTOR.
Joseph E. Jendrisak
BY
Nobbe & Swope
ATTORNEYS Aug. 26, 1952 J. E. JENDRISAK 2,608,030
MOLD FOR BENDING GLASS PLATES
Filed Oct. 9, 1947 3 Sheets-Sheet 3

INVENTOR.
Joseph E Jendrisak
BY Nobbe & Swope
ATTORNEYS

Patented Aug. 26, 1952

2,608,030

UNITED STATES PATENT OFFICE 2,608,030

MOLD FOR BENDING GLASS PLATES

Joseph E. Jendrisak, Rossford, Ohio, assignor to Libbey-Owens-Ford Glass Company, Toledo, Ohio, a corporation of Ohio Application October 9, 1947, Serial No. 778,810

11 Claims. (Cl. 49—67)

This invention relates to glass bending molds and in particular to apparatus for supporting a glass sheet or plurality of superimposed glass sheets during the bending operation so that the optical quality of the glass sheet or sheets is not adversely affected by the bending operation.

It is frequently desired to bend the glass of a window so that it blends into the shape of the surrounding structure. As an example the windshield and the rear and side windows of automobiles are often curved to enhance the styling of the automobile and to provide greater visibility. To be acceptable in use a bent glass window must be free from surface defects and optical distortion that interfere with vision through the window.

Glass intended for curved windows is first formed as flat sheets that are usually ground and polished to secure the required optical qualities. These sheets are then supported on molds and subjected to a sufficiently high temperature to cause the glass to sag until it conforms to the shape of the mold. To preserve the surface and optical qualities of the glass the molds are preferably designed so that the glass is supported along its edges only and the molds are oriented in the heating furnace so that the maximum glass temperature and, if possible, the maximum bending stress in the glass occur in the region having the sharpest curves. By supporting the glass only along its margin the minute imperfections of the otherwise smooth supporting surface, which are reproduced in the surface of the glass as it softens during the bending process, are confined to the marginal portion of the glass that is concealed in the usual window frame. As long as the glass does not slide on its support during the bending operation minute imperfections in the supporting surface will not cause distortions extending toward the central area of the glass. However, if the periphery of the glass is not adequately supported and more particularly if there are excessive discontinuities in the support of the glass during its bending movement the stress that is developed in the glass at the discontinuities causes localized deformation extending into the central area of the glass and produces optical distortion that is easily visible in the finished product.

These distortions are not visible if one looks directly at the glass but are readily apparent if one looks through the glass at an object having straight sides or straight lines on its surface. If there is no distortion present in the glass the object is portrayed in its true form whether one is looking through the glass or not. If there is distortion in the glass due to irregularities in its support during the bending operation the straight lines of the object when viewed through the glass appear to be curved with the degree of curvature varying as the line of sight is shifted from area to area of the window. Another optical effect produced by the distortion of a glass window is the apparent change in shape and location of an object as the line of sight of the observer is shifted from one portion of the window to another portion.

Elimination of distortion is difficult when the curves to be reproduced in the glass sheet are such as to require a concave mold. The disadvantage of the usual concave mold is that the glass sheet before and during bending is supported, at best, along two opposite sides, or, as is usually the case, along one side and at a diagonally opposite corner. As the glass softens and sags to conform to the shape of the mold the marginal portion of the glass sheet slides over the surface of the mold thus marring the surface of the glass.

The principal object of this invention is to provide a mold for bending glass sheets to a desired curvature without marring the glass or affecting its optical qualities. A method of using the mold consists in supporting an edge of the glass sheet or set of superimposed sheets above and out of contact with a shaping surface of the mold while the glass is subjected to bending conditions and until the glass in bending engages the shaping surface of the mold without sliding on that surface.

Another object of the invention is to provide, in a glass bending mold having a shaping surface to which a bent glass sheet conforms, an auxiliary surface for supporting an edge of the glass sheet above and out of contact with the shaping surface during the bending operation and until the glass in bending engages the shaping surface. In its preferred form, the auxiliary surface, formed of a continuous sheet having one portion conforming to the adjacent edge of the shaping surface and another portion conforming to and in supporting relation to the edge of an unbent glass sheet positioned in the mold, serves to support the edge of the glass sheet as the sheet softens and as the edge slides down the supporting surface until the marginal area of the glass sheet engages the shaping surface of the mold.

A still further object of the invention is to fashion the auxiliary or supporting surface of the mold from a resilient material, i. e., resilient in a sense that it yields to accommodate irregularities in the edge of the glass sheet.

An ancillary object is to produce a resilient supporting surface by clamping a heat-resistant flexible sheet over the open side of a U-shaped frame or channel the sides of which are shaped to produce the desired supporting surface configuration.

Other objects and advantages are apparent from the following description in which reference is made to the accompanying drawings.

In the drawings:

Figure 4 is a side elevation of the improved mold.

Figure 5 is a section taken along the line 5—5 of Figure 4.

Figure 6 is a fragmentary vertical section of the resilient supporting surface and the adjacent portions of the molding or shaping surface as seen from the line 6—6 of Figure 3.

Figure 7 is a diagrammatic section taken along the line 6—6 of Figure 3 to illustrate the action of the glass sheet being bent during the bending operation.

Figure 8 is a fragmentary elevation of the upper portion of the mold to show the construction lines employed to determine the shape of the resilient supporting surface.

Figures 9 and 10 are vertical sections illustrating an alternative method of mounting the resilient supporting surface.

These specific figures and the accompanying description are intended merely to illustrate the invention but not to impose limitations on the claims.

The invention consists of apparatus for bending glass sheets to a predetermined curvature. A method of using the apparatus consists in arranging a sheet of glass in bending relation to the mold, initially supporting an edge of the glass sheet out of contact with the shaping surface of the mold and subjecting the glass sheet to bending conditions while continuing to support the edge of the glass sheet during the bending of the sheet and until the supported edge engages the shaping surface of the mold. An improved mold, useful in carrying out this method of bending a glass sheet, includes in addition to the shaping surface of the mold an auxiliary surface, preferably of resilient material, for supporting the edge of the glass sheet during the bending operation.

Figure 1:
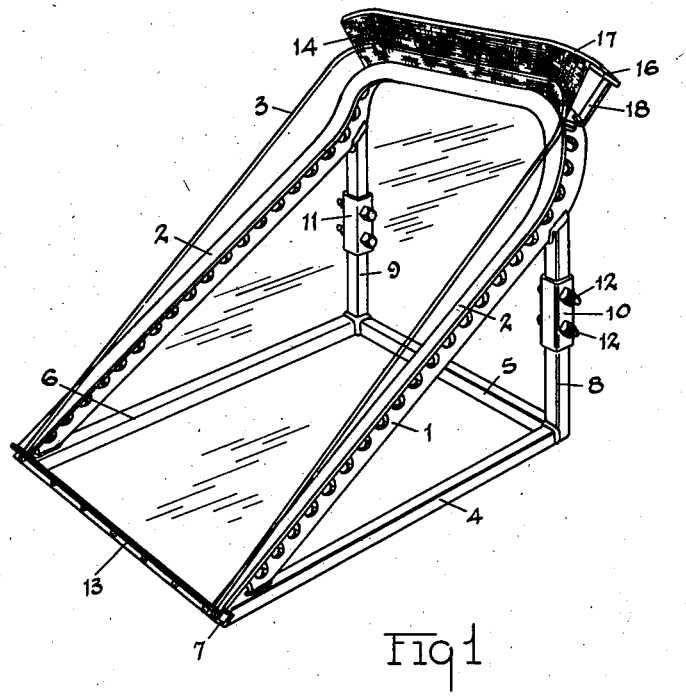
Figure 1 is a perspective view of the improved mold including a resilient supporting surface.
Figure 2:
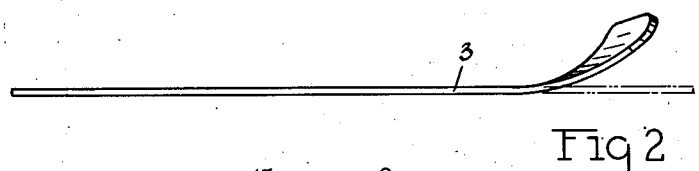
Figure 2 is an edge view of a sheet of glass in its bent form.
Figure 3:
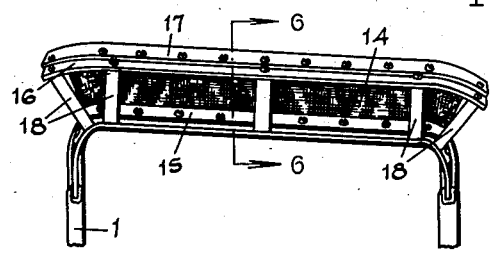
Figure 3 is a rear elevation of the upper portion only of the improved mold.

Referring to the accompanying drawings, the improved mold for bending glass sheets consists of a frame 1 having a shaping surface 2 that conforms to the marginal area of a sheet of glass 3 after the glass has been bent to its final form. The frame 1 is part of a mold structure including base members 4, 5, 6 and 7 and uprights 8 and 9. The base members including the uprights are preferably lengths of rectangular stainless steel tubing that are welded together at the corners and that hold the frame 1 in an inclined position. The frame 1 is placed in inclined position to locate the portion of the glass to be bent in the higher and hotter parts of the furnace while keeping the straight part of the glass in a cooler region. The particular shape that this mold is intended to produce, which is illustrated in Figure 2, consists of a relatively sharp curve that is confined to one end of the glass sheet. This shape of curve is produced by making the mold concave, i. e., bending the upper portion of the glass supporting member upwardly out of the plane of the remainder of the member. This is clearly shown in Figure 4.

The shaping surface 2 of the frame 1 is arranged to contact only a narrow marginal area of the glass sheet 3. The width of the shaping surface 2 may either equal the thickness of the reinforcing part of the frame 1 or it may be wider as is indicated in Figure 5. If the width of the shaping surface 2 equals the thickness of the reinforcing part of the frame 1, the frame may be constructed of a single laterally perforated strip that is bent to the proper shape.

The frame 1 and shaping surface 2, as shown in Figure 5, are constructed by first notching one edge of a strip to leave a series of upstanding teeth and then welding a strip of material forming the surface 2 to the ends of the teeth left along the edge of the strip forming the frame 1. Whether the shaping surface of the mold is formed of two strips welded together or of a single perforated strip is immaterial as long as a minimum amount of material consistent with the required strength is employed. It is desirable to keep the amount of material in this portion of the mold to a minimum so that it will reach substantially the same temperature as the glass without absorbing too much heat from the space adjacent the glass to be bent. Any mass of cool material near the glass makes it that much more difficult to bring the glass to its bending temperature.

The upright members 8 and 9 of the mold framework include adjustable connections 10 and 11 to permit the length of the uprights to be adjusted and thus square or slightly distort the mold as may be required to secure exact correspondence between the shape of the glass shaping surface 2 and the desired configuration of the bent glass sheets. The adjustable members 10 and 11 consist of sleeves that telescope over and join the upper and lower portions of the uprights 8 and 9 and that are clamped to the uprights by means of bolts 12 that pass through the sleeves and the uprights either of which may be slotted to permit the adjustment.

The adjustment of the mold permitted by the connections 10 and 11 in the uprights 8 and 9 allows the mold to be maintained in substantial agreement with the curvature required in the bent glass sheets. A mold could be constructed by welding together a framework and machining thereon a shaping surface that conforms to the shaping surface required in the bent glass sheet. However, it is practically impossible to construct such a mold that will accurately maintain its shape during the heating and cooling cycles to which it is subjected in passing through a glass bending furnace. In order that the mold shall season to its proper shape it is necessary to provide some adjustment that can be made during the seasoning process or else fully season a mold and then machine the shaping surface to the desired configuration. Even if the mold is machined after seasoning it is still desirable to have the adjustment available in order to counteract any warping that may be encountered in the use of the mold.

When a flat sheet of glass is placed on the mold its lower edge rests on the upper surface of the base member 7, which surface is coplanar with the adjacent part of the shaping surface 2, and is positioned thereon by an angle strip 13 (see Fig. 4) affixed to the frame member 7. The marginal portion at the upper end of the glass sheet 3, in the absence of any other support, rests on the uppermost corner of the upper portion of the frame 1 and during the bending operation slides over that portion of the frame 1 until it conforms to the shaping surface 2. With this arrangement, if the glass sheet has a considerable overhang in its unbent position, it may bend over the mold, giving the sheet a reverse bend, before sliding down into contact with the shaping surface of the mold. Even if this reverse bending does not occur, the sliding of the glass over the edge of the mold has an abrasive action on the glass which scratches and mars the surface. Moreover, concentration of stress resulting from the point contact of the glass sheet 3 with the upper end of the frame 1 as well as a localized stress generated in the glass as it slides over the upper portion of the frame 1 creates enough distortion in the clear area of the glass 3 to make it commercially objectionable.

To adequately support the upper edge of the glass sheet 3 prior to and during the bending operation an auxiliary surface 14 consisting of a heat resistant resilient material is provided. The material for the auxiliary surface 14, to be satisfactory as a support for the glass during the bending operation, must be highly heat resistant, it preferably is resilient in the sense that it deforms in small areas to accommodate irregularities in the edge of the glass sheet without creating localized stresses in the glass, it must be of sufficiently fine texture or smooth surface finish in itself so that its surface irregularities do not produce localized areas of high stress in the glass and it should be wear-resistant so as not to require frequent replacement. These requirements are fulfilled to a more or less degree by some of the finer grades of glass cloth or by stainless steel screens of approximately 400 mesh, or by suitable combinations of materials in which one material provides the substantially smooth resilient surface and another material provides the required strength.

Referring to Figure 6 the upper portion of the frame 1 including the shaping surface 2 is shown in enlarged scale. In this portion the width of the shaping surface 2 is reduced so that its upper edge coincides with the upper edge of a sheet of bent glass as it conforms to the surface 2. The auxiliary surface 14 in this example is formed of one or more sheets of glass cloth that are clamped by means of a plate 15 to the frame 1 with the edge of the clamped section of the material coinciding with the edge of the glass shaping surface 2. From this region the material forming the surface 14 is stretched upwardly and over the edge of a template 16 and clamped by a plate 17. The template 16 carried on a plurality of brackets 18 is supported in spaced relation from the frame 1 and is given a shape such that when a sheet of flat glass is placed with its lower edge on the angle strip 13 at the base of the mold its upper edge will contact the resilient surface 14 throughout substantially the full width of the mold.

When the glass is heated to its softening temperature it sags and its upper edge slides downwardly along the surface 14 until it finally comes to rest on the mold shaping surface 2. The successive positions assumed by the upper edge of the glass sheet 3 are illustrated in Figure 7 in which its unbent position is shown at "a" and its final or bent position is shown at "b". During the transition from the initial to the final position the flexible or resilient material forming the surface 14 acts as a cushioning support to prevent the glass sheet from twisting or developing any ripples or strain lines extending into the clear central area of the sheet.

Figure 7 also illustrates a procedure to be followed in determining the shape of the template 16. The shape of the mold shaping surface 2 is uniquely determined by the configuration desired in the finished glass sheet. Before bending the glass sheets are cut according to a pattern developed from the shape of the desired bent glass sheet. Such an unbent glass sheet may be placed on the mold and blocked up to a position corresponding to the position of the sheet 3 in Figure 4 to locate the initial position of the upper edge of the glass sheet. The position of the template 16 is next selected. The only requirement that must be met is that the template, while generally parallel to the upper edge of the shaping surface 2, is spaced far enough from that surface so that it overhangs the upper edge of the unbent glass sheet located on the mold. A plurality of straight construction lines 19 (see also Fig. 8) are then drawn from closely spaced points along the upper edge of the shaping surface 2, through the edge of the glass sheet on the mold and are continued upwardly until they intersect the template 16. The front edge of the template is located by a smooth curve passed through the intersections of the construction lines 19 and the template 16. This method of construction assumes that the material for forming the surface 14 is flexible and that it is stretched to provide its resiliency. When the material is stretched in place it provides a resilient surface of which the construction lines 19 may be considered as elements.

By construction the resilient surface 14 has its lower portion clamped so that it conforms to the edge of the shaping surface 2 of the mold and has an intermediate portion that conforms to the edge of an unbent glass sheet supported in bending relation to the mold. Furthermore, the action of the glass sheet as it is subjected to bending conditions and as it bends from its initial flat state to its final bent state is such that the edge slides down along the surface 14 while the surface gives sufficient support to prevent any reverse bending of the edge of the sheet and to prevent any distortion caused by insufficient support of the sheet.

A process for bending glass sheets to a predetermined curvature may be desired in relation to the improved mold. The process consists in first placing a sheet of glass in bending relation to the mold, i. e., placing the glass sheet over the shaping surface of the mold in position so that as it sags during bending its margins will engage the shaping surface. The next step in the process is supporting the upper edge of the glass sheet out of contact with the shaping surface. This support by means other than the shaping surface of the mold is necessary because the length of the glass sheet is greater than the chord of the mold and without the auxiliary support the glass would rest on the edge of the shaping surface and would slide over that surface during the bending operation. This sliding action scratches the glass and furthermore the irregularities in the edge of the shaping surface cause the weight of the glass to be carried at a few points rather than being evenly distributed with a result that the glass sags between the support points thus producing an inferior product. As long as the glass is supported at its edge and is held out of contact with the shaping surface during the bending operation and until the edge is ready to engage the shaping surface without sliding thereover there is little chance for the glass to take reverse bend or to be scratched or distorted.

The complete bending process also includes the steps of subjecting the glass to bending conditions and in continuing to support the edge until the bending operation is substantially completed. Various forms of support to hold the edge of the glass out of contact with the shaping surface may be devised since the only requirement is that the glass be supported at its edge and that there be no sharp discontinuities in the support of the edge. In the example illustrated the sharp discontinuities are eliminated by making the supporting surface of a soft resilient material adapted to cushion the edge of the sheet of glass.

To facilitate the bending operation the shaping surface of the mold is inclined from the horizontal and the glass when in bending relation to the mold is located above the shaping surface of the mold with most of its weight resting on its lower edge and with its upper edge leaning against the soft supporting surface. In this position it is relatively easy to subject the upper part of the glass sheet to higher temperatures than the lower portion and thus secure a combination of bending stress in the glass and temperature of the glass that proportions the bending effect according to the sharpness of the curve to be produced in the glass.

An alternative method of mounting the resilient surface is illustrated in Figures 9 and 10. In these figures a resilient surface 20 is formed by clamping a sheet of glass cloth or screen of heat resistant material over the open side of a U-shaped channel 21 one leg 22 of which is cut and bent to conform to the edge of the shaping surface 2 and the other leg 23 of which is cut so that an intermediate section of the surface 20 conforms to and supports the edge of a flat sheet of glass to be bent. Figure 9 illustrates such a construction where the surface is substantially coplanar with the shaping surface 2 while Figure 10 illustrates a similar construction to be used where the resilient supporting surface must be inclined at a substantial angle to reach the edge of the glass sheet being supported thereby.

In either case the resilient sheet of material may be held by a clamping plate 24 which is secured by bolts 25 that clamp the assembly to the frame 1.

Figure 11:
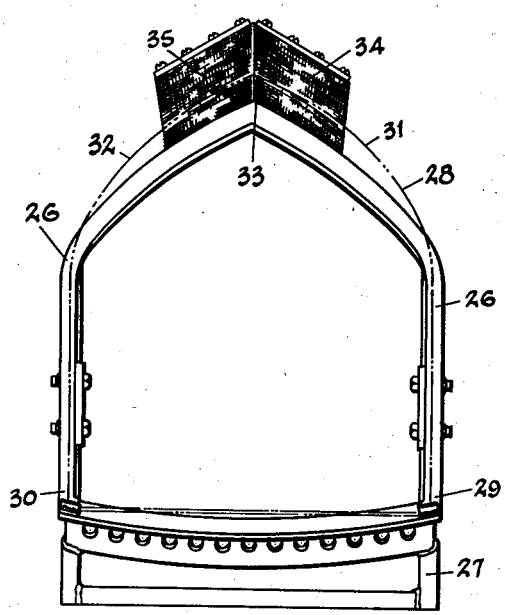
Figure 11 is a front elevation of another mold illustrating the use of the invention.
Figure 12:
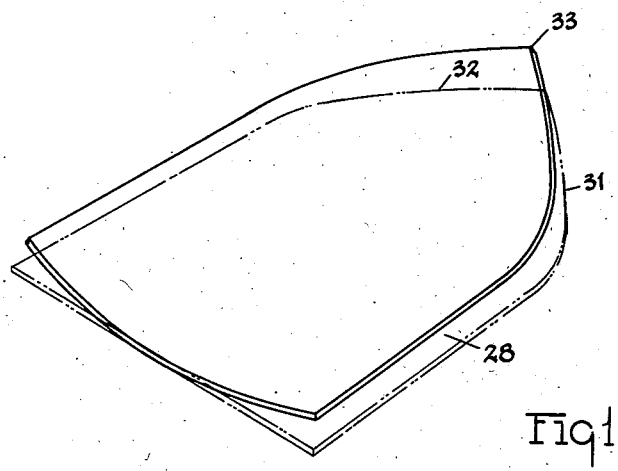
Figure 12 is a perspective view showing the original and final forms of a glass sheet as produced in the mold shown in Figure 11.

Figure 11 illustrates a mold employing more than one auxiliary supporting surface, which mold is suitable for producing a glass sheet that is curved transversely as well as longitudinally as illustrated in Figure 12. In this mold a shaping surface 26 extending completely around the periphery of the bent sheet is supported on a framework 27 somewhat similar to the framework supporting the frame 1 of the previous example. A glass sheet 28 when placed over this mold for bending is supported at the lower corners of side portions 29 and 30 of the shaping surface 26. Its upper edges 31 and 32 meeting at a point 33 rest against a V-shaped arrangement of resilient surfaces 34 and 35. During the bending operation the upper edges 31 and 32 of the glass sheet 28 rest against and slide on the resilient surfaces 34 and 35 until the glass conforms to and rests on the shaping surface 26. In this example the transverse curve in the glass sheet is not sufficiently sharp to introduce any difficulty because of the concentrated stress at the lower corners of the glass sheet. As the glass is heated it first bends near its center where the bending moment is greatest and this tends to complete the sliding action of the lower corners of the glass sheet over the corners 29 and 30 of the mold before there is substantial softening of the glass at these corners.

At the upper or pointed end of the glass sheet the resilient surfaces 34 and 35 support and cushion the glass during the bending operation so that it settles gradually and easily into contact with the shaping surface 26. In this example, as in the previous example, the resilient surface must cushion the glass and absorb any irregularities in dimension such as the nicks and projections left during the cutting operation without allowing these irregularities to introduce localized stresses in the portions of the glass that are heated to the bending temperature.

While fine-textured glass cloth and fine mesh metallic screen have been mentioned as possible materials from which to construct the resilient supporting surfaces of the mold it is to be understood that any material that is sufficiently heat resistant to stand the temperatures to which the glass is subjected and which is sufficiently resilient in respect to accommodating small irregularities in the edge of the glass sheet is satisfactory as a transition support along which the edge of the glass sheet may rest and slide as it softens and bends to conform to the shape of a concave mold.

Various modifications in the shape of the mold and the method of supporting the resilient surface may be made to adapt the improved mold to the various shapes of glass sheets that are to be bent.

Having described the invention, I claim:

1. In a mold for bending glass sheets, the combination with a sheet shaping surface having a predetermined contour on said mold, of an edge supporting and guiding surface having a different contour than said sheet shaping surface and extending outwardly therefrom, the contour of said sheet shaping surface conforming to the shape that it is desired to bend a glass sheet on said mold, and the contour of said edge supporting and guiding surface conforming substantially to the natural path followed by one sharp edge of a glass sheet when located in bending position over said mold during movement of said sheet from its flat to its bent state on said mold while being maintained out of contact with said sheet shaping surface.

2. In a mold for supporting glass sheets during the bending thereof, in combination, a shaping surface conforming to the margin of the bent sheet of glass, and a support for carrying an edge of the glass sheet prior to and during its transition from its flat state to its bent state, the support consisting of a resilient sheet that is held in a shape conforming to the surface traced by the edge of the supported glass sheet during its transition from its flat to its bent state, said support being arranged at an angle to said bending surface that will prevent the surface of said sheet from coming in contact therewith during the bending movement.

3. In a mold for supporting glass sheets during the bending thereof, in combination, a shaping surface conforming to the margin of the bent sheet of glass, and a support consisting of a sheet of woven material that is attached along a portion of the shaping surface and to a member shaped and positioned so that an intermediate portion of the sheet of woven material conforms to the adjacent edge of an unbent glass sheet carried on the mold and supports the edge of the glass sheet prior to and during its transition from its flat to its bent state.

4. In a mold for supporting glass sheets during the bending thereof, in combination, a shaping surface conforming to the margin of the bent sheet of glass, and a support consisting of a sheet of flexible heat resistant material that is attached along a portion of the said shaping surface and to a member shaped and positioned so that an intermediate portion of the flexible material conforms to the supported edge of an unbent glass sheet.

5. In a mold for supporting glass sheets during the bending thereof, in combination, a shaping surface conforming to the margin of the bent sheet of glass, and a support consisting of a sheet of glass cloth that is attached along a portion of the said shaping surface and to a member shaped and positioned so that the glass cloth conforms to an edge of the glass sheet and is positioned to support the edge of the sheet prior to and during its transition from its flat to its bent state.

6. In a mold for supporting glass sheets during the bending thereof, in combination, a shaping surface conforming to the margin of the bent sheet of glass, and a support consisting of a resilient sheet of metallic material that is attached along a portion of the said supporting surface and to a member shaped and positioned so that the sheet of metallic material conforms to an edge of the glass sheet prior to and during its transition from its flat to its bent state.

7. In a mold for supporting glass sheets during the bending thereof, in combination, a shaping surface conforming to the margin of the bent sheet of glass, a sheet of heat resistant material, means for attaching the material along a portion of said shaping surface, a member mounted in spaced relation to said shaping surface, and means for attaching the material to said member.

8. In a mold for supporting glass sheets during the bending thereof, in combination, a shaping surface conforming to the margin of the bent sheet of glass, a sheet of heat resistant material, rigid spaced-apart members for supporting the sheet of material, one of said members conforming to the edge of a portion of said shaping surface, the other of said members having a shape such that intermediate sections continuously contact the adjacent edge of the glass sheet during the bending process.

9. In a mold for supporting glass sheets during the bending thereof, in combination, a shaping surface conforming to the margin of the bent sheet of glass, a U-shaped channel one leg of which conforms to a portion of said shaping surface, and a sheet of resilient material stretched over the open side of the U-shaped channel to form a support for a sheet of glass on the mold before and during the bending process.

10. In a mold for supporting glass sheets during the bending thereof, in combination, an upwardly directed generally concave shaping surface that conforms to the margin of the bent sheet of glass, means for positioning a glass sheet over the shaping surface with a first portion substantially in engagement with the shaping surface and other portions overhanging the edges of the shaping surface, and resilient surfaces located along the overhung portions of the shaping surface for supporting an edge of the glass sheet, each of the resilient surfaces having a first portion conforming to the edge of the shaping surface and another portion conforming to the overhanging edge of an unbent glass sheet positioned over the shaping surface.

11. In a mold for bending glass sheets, the combination with a sheet shaping surface having a predetermined contour on said mold, of an edge supporting and guiding member having an edge supporting and guiding surface provided with a different contour from said sheet shaping surface and extending outwardly from said mold, the contour of said sheet shaping surface conforming to the shape that it is desired to bend a glass sheet on said mold, and the contour of said edge supporting and guiding surface conforming along a line adjacent said sheet shaping surface to an edge of said sheet shaping surface and conforming along a line spaced from said sheet shaping surface to a sharp edge of a flat glass sheet when located in bending position over said mold and conforming in its areas between said lines substantially to the natural path followed by said sharp edge during movement of said sheet from its flat to its bent state on said mold while being maintained out of contact with said shaping surface.

JOSEPH E. JENDRISAK.

REFERENCES CITED

The following references are of record in the file of this patent:

UNITED STATES PATENTS

| Number | Name | Date |
| --- | --- | --- |
| 417,097 | Scott | Dec. 10, 1889 |
| 682,570 | Sage | Sept. 10, 1901 |
| 2,003,383 | Miller | June 4, 1935 |
| 2,190,807 | Steinberger | Feb. 20, 1940 |
| 2,297,315 | Owen | Sept. 29, 1942 |